March 3, 1970 M. BRISKI 3,498,430
SHIFTING CONTROL FOR A POWER SHIFTED TRANSMISSION
Filed July 19, 1968
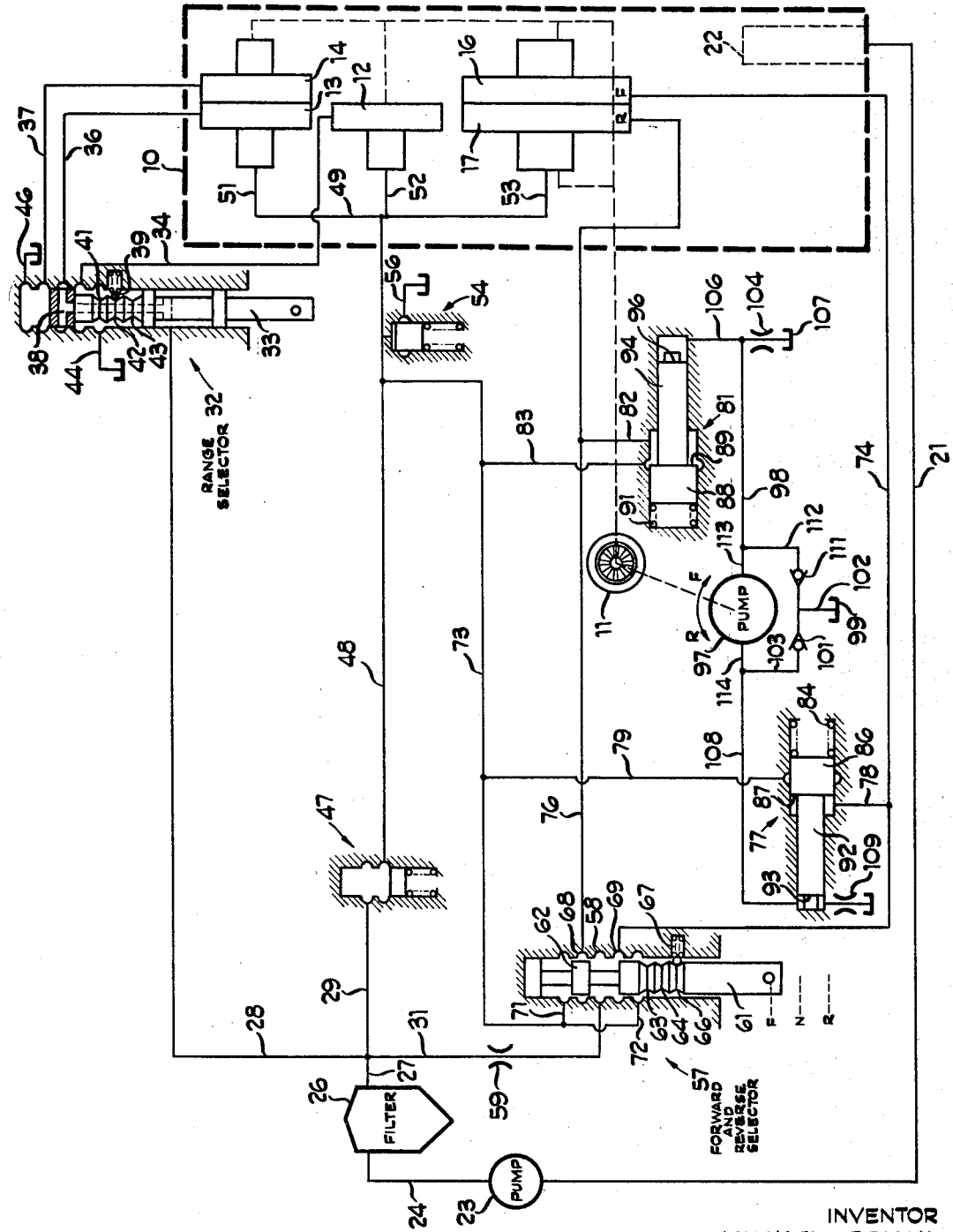
INVENTOR
MICHAEL BRISKI
BY Herman E. Smith
ATTORNEY

United States Patent Office 3,498,430
Patented Mar. 3, 1970

3,498,430
SHIFTING CONTROL FOR A POWER SHIFTED
TRANSMISSION
Michael Briski, Rockford, Ill., assignor to Borg-Warner
Corporation, Chicago, Ill.
Filed July 19, 1968, Ser. No. 746,141
Int. Cl. F16d 25/10, 13/04; F16h 5/42
U.S. Cl. 192—51                                    6 Claims

ABSTRACT OF THE DISCLOSURE

A control circuit for engaging forward and reverse clutches of a power shifted transmission includes a bi-directional pump connected to a vehicle wheel supplying pressure proportional to vehicle speed. The pump output is connected to a pilot circuit for controlling the engaging pressure of the clutches and is arranged to "buffer" the engagement of either clutch when the vehicle is travelling in the opposite direction.

SUMMARY OF THE INVENTION

The present invention relates generally to power shifted transmissions and more particularly to means for regulating the engagement of clutches therein.

In vehicles equipped with a power shifted transmission such as earth moving machinery, it is often desirable to employ the forward and reverse clutches in a braking sense for assistance in bringing the vehicle to a stop. While the use of forward and reverse clutches in a braking sense is beneficial under some circumstances, the abuse or misuse of the clutches in this manner can create destructive shock forces in the equipment and/or result in injury to the vehicle operator. For example, if the reverse clutch should become fully engaged, either intentionally or accidentally, while the vehicle is travelling in the forward direction at high speed, the deceleration experienced by the vehicle and the operator could result in propelling the operator from his seat with loss of control and the possibility of personal injury.

Accordingly, it is an object of the present invention to provide means for reducing shift shock in a forward to reverse or reverse to forward shift in a vehicle having a power shifted transmission. A more particular object of the invention is to provide a bi-directional wheel driven pump supplying hydraulic pressure proportional to vehicle speed for opposing full engagement of an opposite clutch when the vehicle is in motion. Other objects and advantages of the invention will become apparent to those skilled in the art from consideration of the following description together with the drawing.

BRIEF DESCRIPTION OF THE DRAWING

The figure is a schematic diagram of a control circuit for a power shifted vehicle transmission.

DESCRIPTION OF THE PREFERRED EMBODIMENT

Referring now to the drawing, the reference character 10 represents a power shifted transmission for a self-propelled vehicle having a ground engaging wheel 11, arranged to rotate at a speed and in a direction in accordance with vehicle speed and direction. Transmission 10 includes a forward clutch 16 and a reverse clutch 17 for selecting the direction of rotation of the transmission output drive connection. In addition, transmission 10 may include a number of range clutches such as clutches 12, 13, 14 for selection of a desired speed range.

Each of clutches 12, 13, 14, 16 and 17 is indicated as being of the hydraulically engageable type held in engagement by the application of fluid under pressure and is released by reducing the pressure of the actuating fluid. A control circuit is provided for supplying pressurized actuating fluid to various of said clutches for selecting the speed range and direction of travel of the vehicle. If desired, the forward clutch 16 or reverse clutch 17 may be engaged in a braking sense to assist in braking the motion of the vehicle. For example, reverse clutch 17 may be engaged while the vehicle is travelling in the forward direction in order to retard the forward motion of the vehicle. Likewise, forward clutch 16 may be engaged while the vehicle is travelling in the reverse direction in order to retard the reverse motion of the vehicle.

The control circuit for engaging the clutches includes a supply conduit 21 connected to a source of fluid 22 such as an oil sump located in transmission 10. A supply pump 23 has an inlet connected to supply conduit 21 and an outlet connected to conduit 24 for delivering fluid under pressure to filter 26. In turn, the outlet of filter 26 is connected through conduit 27 to the three conduits 28, 29 and 31.

A range selector valve 32 is connected to conduit 28 and includes a manually movable spool member 33 for directing actuating fluid alternatively to the three conduits 34, 36, 37, which are in turn connected to the range clutches 12, 13, 14. Spool member 33 includes an internal passage 38 for conducting actuating fluid from conduit 28 to the selected one of the clutch engaging conduits 34, 36, or 37. A spring loaded detent 39 is engageable with an appropriate one of the three grooves 41, 42, 43 in spool member 33 for maintaining passage 38 in communication with the desired one of the engaging conduits 34, 36 or 37. As shown in the drawing, detent 39 is engaged with the groove 42 for maintaining passage 38 in communication with engaging conduit 36. Actuating fluid is thus conducted from supply pump 23 to conduit 36 for engaging range clutch 13. At the same time, range clutches 12 and 14 become disengaged as a result of the relief of fluid therefrom through the return lines 44 and 46.

Spool member 33 may be moved inwardly from the position shown in the drawing, engaging detent 39 with groove 43 for supplying actuating fluid to range clutch 14. In the inward position, spool member 33 provides for the disengagement of range clutches 12 and 13 by relief of fluid therefrom through line 44. In like manner, spool member 33 may be moved outwardly, engaging detent 39 with groove 41, for engaging range clutch 12 and disengaging range clutches 13 and 14. In the outward position spool member 33 provides for supplying actuating fluid from conduit 28, through passage 38 to engaging conduit 34 for range clutch 12, while permitting the relief of fluid from range clutches 13 and 14 through the conduits 36 and 37 and return line 46.

Conduit 29 is connected to a pressure relief valve 47 which bleeds off a portion of the fluid supplied by pump 23 to a lubrication circuit including conduits 48, 49, 51, 52, 53. A second pressure relief valve 54 is connected to lubrication conduit 48 for relieving excess pressure from the lubrication circuit through return line 56.

Conduit 31 is connected to the inlet port 58 of a manually shiftable forward and reverse selector valve 57 through a flow restrictor 59. Forward and reverse valve 57 includes a manually movable spool member 61 having a land member 62 for alternatively directing actuating fluid to either of outlet ports 68, or 69. Three grooves 63, 64, 66 are provided on spool member 61 engageable with spring biased detent 67, for maintaining spool member 61 in one of three positions corresponding to Forward, Neutral, and Reverse. When spool member 61 is in the middle or neutral position, land 62 laps inlet port 58 preventing the flow of actuating fluid from conduit 31 to either of outlet ports 68 or 69. When land 62 laps inlet port 58, the outlet port 68 is in communication with return line 71 and outlet port 69 is in communication with return line 72. Return lines 71 and 72 are connected to conduit 73 which in turn is connected to conduit 48 in the lubrication circuit.

Outlet port 69 is connected to forward clutch 16 through forward pressure conduit 74 while outlet port 68 is connected to reverse clutch 17 through reverse pressure conduit 76. Thus when land 62 laps inlet port 58, both forward clutch 16 and reverse clutch 17 are relieved of engaging pressure through the return lines 71 and 72.

As shown in the drawing, spool member 61 has been shifted from the neutral position inwardly to the forward position. In the forward position, inlet port 58 is in communication with outlet port 69 such that actuating fluid is directed to forward pressure conduit 74 for engaging forward clutch 16. Outward movement of spool member 61 to the reverse position, would result in dumping the apply pressure from the forward clutch as the spool member passed through the neutral position, and would then divert actuating fluid from inlet port 58 to outlet port 68 for engaging reverse clutch 17.

A forward pilot operated relief valve 77 is connected to forward pressure conduit 74 by conduit 78 and to the relief conduit 73 by conduit 79. A similar reverse pilot operated relief valve 81 is connected to reverse pressure conduit 76 by means of conduit 82 and to relief conduit 73 by means of conduit 83. Forward pilot relief valve 77 includes a biasing spring 84 bearing against land portion 86 urging land portion 86 in a direction to lap the connection with relief conduit 79. Land portion 86, in part, defines a shoulder 87 which is acted upon by the fluid in forward pressure conduit 74. Excess pressure in forward pressure conduit 74 urges land portion 86 in a direction to uncover the connection with relief conduit 79 against the bias of spring 84 thereby establishing a reference pressure for determining the maximum engaging pressure exertable on forward clutch 16. Similarly reverse pilot operated relief valve 81 is provided with a land portion 88 defining a shoulder 89 and having a biasing spring 91 acting thereon for establishing the maximum engaging pressure exerted on reverse clutch 17.

Each of the pilot operated relief valves 77 and 81 is also provided with a pilot piston acting in opposition to the biasing springs. Valve 77 includes the pilot piston 92 having a face 93, and valve 81 includes a similar pilot piston 94 having a face 96.

An auxiliary bi-directional pilot pump 97 is connected to vehicle wheel 11 for rotation in a direction and at a speed corresponding to vehicle speed and direction. As indicated in the drawing, wheel 11 is rotating in the clockwise direction signifying forward motion of the vehicle. Such forward motion of the vehicle results in driving pump 97 in a direction to supply pilot fluid under pressure to reverse pilot conduit 98, drawing fluid from a portion of the sump 99 through the conduits 102, check valve 101 and conduit 103. The fluid in pilot conduit 98 is communicated to the face 96 of pilot piston 94 through conduit 106 and to a portion of the sump 107 through flow restrictor 104. When the vehicle is travelling above a predetermined speed in the forward direction, the flow restrictor 104 creates a back pressure in conduit 106 which acts on face 96 of pilot piston 94 urging land portion 88 in a direction to uncover the connection with relief conduit 83. The reverse pressure conduit 76 thus becomes connected to the conduit 73 when the vehicle is travelling in the forward direction above a predetermined speed defined by the pressure characteristics of auxiliary pump 97, the bias of spring 91 and the flow characteristics of flow restrictor 104.

If selector valve 57 is moved outwardly to the reverse position for engaging reverse clutch 17 while the vehicle is travelling in the forward direction, the engaging pressure in reverse pressure conduit 76 is applied to the annular shoulder 89 of valve 81 and becomes additive with the force exerted on face 96 by the pilot pressure against the bias of spring 91 thereby dumping actuating fluid through relief conduit 83. As the forward motion of the vehicle decreases in velocity, the pilot pressure produced by pump 97 and acting on piston face 96 decreases allowing land portion 88 to lap the connection with relief conduit 83 under the bias of spring 91. The engaging pressure in reverse pressure conduit 76 can then increase to provide full engagement of reverse clutch 17.

In a similar manner, pump 97 is connected to a forward pilot conduit 108 which communicates pilot fluid to the face 93 of forward pilot piston 92 and flow restrictor 109 when the vehicle is travelling in the reverse direction. When the vehicle is travelling in the reverse direction, auxiliary pilot pump 97 draws fluid from sump portion 99 through conduit 102, check valve 111, conduit 112, and port portion 113. Pilot fluid is delivered under pressure through port portion 114 to forward pilot conduit 108, piston face 93 and flow restrictor 109 as described above. Thus, when the vehicle is travelling in the reverse direction and the selector valve is shifted from reverse to forward, the engagement of the forward clutch is delayed until the vehicle speed drops to a safe value.

While a preferred embodiment of the invention has been shown and described, various alterations and modifications, within the spirit and scope of the invention, will be suggested to those skilled in the art.

I claim:

1. In a power shifted transmission for a self-propelled vehicle having a ground engaging wheel rotatable in accordance with the speed and direction of movement of said vehicle, said transmission including hydraulically actuated forward and reverse clutches selectively engageable for driving said vehicle in forward and reverse direction, an improved control circuit for automatically regulating the rate of engagement of said forward and reverse clutches including: a pilot operated relief valve for each of said clutches for regulating the engaging pressure applied thereto in accordance with the speed and direction of the vehicle for reducing the shock of reversal of direction, and a bi-directional pump drivingly connected to said vehicle wheel in fluid communication with each of said pilot operated relief valves, said pump being effective to deliver pressure fluid to a first of said pilot operated relief valves for said reverse clutch in response to movement of said vehicle in said forward direction, and for delivery of pressure fluid to the second one of said pilot operated relief valves for said forward clutch in response to movement of said vehicle in said reverse direction, said pump and relief valves providing means for delaying engagement of said reverse clutch when said vehicle is travelling in said forward direction and for delaying engagement of said forward clutch when said vehicle is travelling in said reverse direction.

2. In a power shifted transmission according to claim 1, said control circuit including a manually shiftable valve for selectively engaging said forward and reverse clutches providing means for braking the movement of said vehicle, each of said pilot operated relief valves including biasing means establishing a reference pilot pressure above which said relief valve is actuatable for relieving engaging pressure from an associated clutch, said reversible pump providing fluid under a variable pilot pressure proportional to vehicle speed acting in opposition to said biasing means, said biasing means and pump in combination providing means for delaying full engagement of a clutch in a braking sense until the speed of said vehicle is below a predetermined value.

3. In a power shifted transmission according to claim 1, said control circuit including a manually shiftable valve for selectively engaging said forward and reverse clutches providing means for braking the movement of said vehicle, said pilot operated relief valves each having biasing means establishing a pilot pressure above which said relief valve is actuatable for relieving engaging pressure from an associated clutch, and being connected with a fluid flow restrictor for relieving pilot fluid therefrom for establishing a pilot fluid flow below which said relief valve is ineffective to overcome the bias of said biasing means, said variable pressure pump and said flow restrictor in combination, providing means effective to prevent full engagement of a clutch in the braking sense when the speed of said vehicle is above a predetermined value.

4. In a power shifted transmission for a self-propelled vehicle having a ground engaging wheel rotatable in accordance with vehicle speed and direction of movement, said transmission including hydraulically actuated forward and reverse clutches selectively engageable for driving said vehicle in forward or reverse direction, an improved control circuit for operation of said forward and reverse clutches including: a supply pump providing a source of pressure fluid; a selector valve having an inlet port connected to said supply pump, a pair of outlet ports and a shiftable member for directing pressure fluid alternatively to either of said outlet ports; a forward pressure conduit communicating one of said outlet ports with said forward clutch, a reverse pressure conduit communicating the other of said outlet ports with said reverse clutch; a forward pilot operated pressure relief valve connected to said forward pressure conduit; a reverse pilot operated pressure relief valve connected to said reverse pressure conduit; and a speed and direction sensing pump drivingly connected to said vehicle wheel having a pair of ports connected to a pair of pilot conduits, one of said pilot conduits being connected to said forward pilot operated relief valve, and the other of said pilot conduits being connected to said reverse pilot operated relief valve, said speed and direction sensing pump being adapted to deliver pressure fluid to said reverse pilot operated relief valve in response to movement of said vehicle in said forward direction and alternatively to supply pressure fluid to said forward pilot operated relief valve in response to movement of said vehicle in said reverse direction, said speed and direction sensing pump thereby providing a source of pressure for delaying engagement of said reverse clutch when said vehicle is moving to the forward direction and for delaying engagement of said forward clutch when said vehicle is moving in said reverse direction.

5. In a power shifted transmission according to claim 4, each of said pilot operated pressure relief valves including biasing means establishing a pilot pressure above which said valve is effective for relieving engaging pressure from an associated clutch, said speed-and-direction sensing pump providing fluid under a variable pressure proportional to vehicle speed in opposition to said biasing means, said speed-and-direction sensing pump and biasing means in combination providing means for delaying engagement of said reverse clutch until the speed of said vehicle in said forward direction is below a predetermined value, and for delaying engagement of said forward clutch until the speed of said vehicle in said reverse direction is below a predetermined value.

6. In a power shifted transmission according to claim 4, each of said pilot conduits including a flow restrictor for relieving fluid from an associated pilot operated relief valve below a predetermined speed of rotation of said wheel, each of said pilot operated relief valves including biasing means establishing a pilot pressure above which said valve is effective to relieve engaging pressure from an associated clutch, said biasing means, said speed and direction sensing pump and said flow restrictors in combination providing means effective to delay full engagement of said reverse clutch until the speed of said vehicle in said forward direction is below a predetermined value, and for delaying full engagement of said forward clutch until the speed of said vehicle in said reverse direction is below a predetermined value.

References Cited
UNITED STATES PATENTS 2,732,727   1/1956   Livermore _____ 74—865
3,348,644  10/1967   Hilpert.

MARK M. NEWMAN, Primary Examiner

A. D. HERRMANN, Assistant Examiner

U.S. Cl. X.R.

74—336.5; 192—87.19